(12) United States Patent
Wakat et al.

(10) Patent No.: US 6,419,475 B1
(45) Date of Patent: Jul. 16, 2002

(54) APPARATUS FOR TREATING PAINT ROLLER COVERS

(75) Inventors: George H. Wakat, St. Paul Park, MN (US); Alan Neumann, Frederic, WI (US)

(73) Assignee: Wagner Spray Tech Corporation, Minneapolis, MN (US)

( * ) Notice: Subject to any disclaimer, the term of this patent is extended or adjusted under 35 U.S.C. 154(b) by 0 days.

(21) Appl. No.: 09/410,645

(22) Filed: Oct. 1, 1999

Related U.S. Application Data

(62) Division of application No. 08/840,202, filed on Apr. 11, 1997, now Pat. No. 5,980,802.

(51) Int. Cl.⁷ ............................................. B29C 59/02
(52) U.S. Cl. ..................... 425/385; 425/392; 425/393; 425/402
(58) Field of Search ................................ 425/385, 392, 425/393, 402

(56) References Cited

U.S. PATENT DOCUMENTS

| | | | |
|---|---|---|---|
| 2,909,990 A | * 10/1959 | Judisch | 425/385 |
| 3,478,144 A | * 11/1969 | Sato | 425/385 |
| 3,646,648 A | 3/1972 | Kappelman et al. | |
| 3,649,151 A | 3/1972 | Mathews | |
| 3,777,631 A | 12/1973 | Trask | |
| 4,119,020 A | 10/1978 | Sharp et al. | |
| 4,257,140 A | * 3/1981 | Downing | |
| 4,480,982 A | * 11/1984 | Sexstone et al. | 425/385 |
| 4,517,046 A | * 5/1985 | Heaney et al. | 425/385 |
| 4,551,297 A | 11/1985 | Bötcher et al. | |
| 4,696,635 A | * 9/1987 | Ohtani et al. | 425/385 |
| 4,818,460 A | 4/1989 | Nied | |
| 4,883,449 A | * 11/1989 | Heaney et al. | 425/385 |
| 5,238,642 A | * 8/1993 | Benquet et al. | 425/385 |
| 5,266,257 A | 11/1993 | Kildune | |
| 5,533,880 A | 7/1996 | Hayakawa et al. | |
| 5,693,141 A | * 12/1997 | Tramont | |
| 5,713,095 A | * 2/1998 | Wakat | |
| 5,769,153 A | 6/1998 | Ayers | |

* cited by examiner

Primary Examiner—James P. Mackey
(74) Attorney, Agent, or Firm—Faegre & Benson, LLP

(57) ABSTRACT

A method for treating a roller cover includes the steps of positioning an element with respect to a roller cover and removing a portion of the roller cover with the element to form a pattern on the roller cover. The process for treating roller covers for a paint roller may also include the steps of providing a surface, forming a pattern on the surface, heating the surface, and contacting the roller cover with the heated surface. The heated surface is a metal. The heat is transferred from the heated metal surface to the roller cover when the heated metal surface contacts the roller cover. The heated surface sears or melts the nap of the roller cover. The surface can be provided with a pattern so that a pattern can be placed into the nap of the roller cover. An apparatus used to treat the surface of a roller cover includes a surface having a desired pattern therein. A holder for a roller cover holds or presents the roller cover to the surface. A heater is attached to the surface. The apparatus may also include a mechanism for rotating the roller covers and moving one of either the surface or the holders for the roller covers. A roller cover can also be formed by placing a woven fabric which has raised patterns therein onto a roller cover.

5 Claims, 8 Drawing Sheets

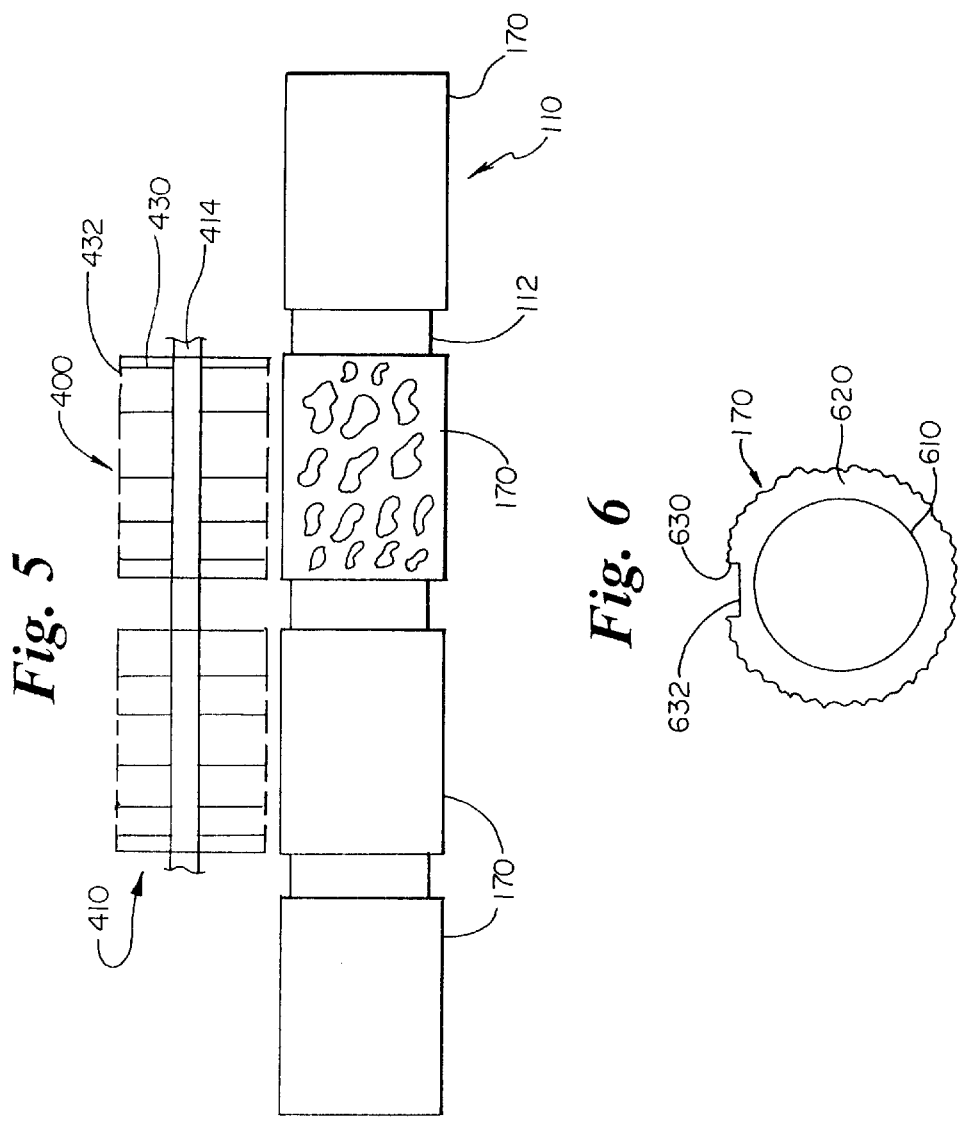

APPARATUS FOR TREATING PAINT ROLLER COVERS

This is a divisional of application Ser. No. 08/840,202, filed on Apr. 11, 1997, now U.S. Pat No. 5,980,802 entitled METHOD AND APPARATUS FOR TREATING PAINT ROLLER COVERS.

FIELD OF THE INVENTION

The present invention relates generally to paint rollers. In particular, the present invention relates to a method and apparatus for fabrication of the covers used on paint rollers.

BACKGROUND OF THE INVENTION

Paint rollers are well known in the art as a fast and convenient means by which to coat a flat surface with a layer of paint. Unfortunately, such rollers are only capable of spreading a uniform coat of a given paint color across the surface, and cannot be effectively used to create designs or patterns on the surface. In the 1930's custom wall painting techniques, such as rag rolling and sponging become popular as a means to attain a decorative, patterned paint coating on a wall, ceiling or the like. Unfortunately, such techniques generally required a great deal of time and skill to successfully complete, making them unfeasible options for the general public. As a result, those wishing to obtain decorative patterns typically have had to resort to covering their walls with wallpaper. However, wallpaper is also very expensive, and its application requires skills that many people do not possess. Wallpaper is also undesirable because its removal is an arduous process that requires a good deal of time.

In recent years it has once again become popular to use custom wall painting in the decoration of homes. Custom wall painting provides a unique look for a room in a particular house and many times, if the home owner is able, the look achieved is somewhat like wallpaper but is much less expensive than wallpaper. The present techniques are also faster than the application of wallpaper, less materials are required and, therefore, there is less to handle. In addition, when custom painting is used as opposed to wallpaper, there is no need to match rolls of paper from various paint batches nor is there a need for matching seams or a need for excessive amounts of equipment. Two of the more common types of custom wall painting used in home decorating are sponging and rag painting. In many instances a home owner is able to use these two techniques to produce a very professional-looking wall or room. It is has become so popular in fact that sometimes professional painters are hired to apply these techniques to rooms of houses.

Custom wall painting has also become desired for commercial applications in large-scale buildings. The custom wall painting produces a wallpaper effect and is usually cheaper to apply than other wall coverings, such as wallpaper. Even though the current methods for sponge painting and rag rolling a wall or the walls of the room are much quicker than applying wallpaper, it would be advantageous if there were still quicker methods that could be employed to produce custom wall painting. The current method for sponge painting a wall requires rolling or applying an initial base color to a wall and allowing it to dry. After the wall is dry, a second color is used. A natural sponge is dipped into a second color and then the excess paint absorbed by the sponge is blotted away so that the amount of paint left in the sponge is enough to transfer paint onto the wall yet not enough to produce a solid shape onto the wall. The natural sponge is then used to contact the wall and apply the second color of paint over the base color previously applied. Once the paint within the sponge runs out, the sponge is reinserted into the second color, blotted so the excess paint comes off the sponge and then applied to the wall. This process is repeated until the entire wall or room is painted. Even though this method is faster than applying wallpaper to a room, it still has some problems. First of all, paint is wasted since excessive paint is blotted out of the natural sponge. Secondly, the process is time consuming since a first layer of paint must be applied before the second "sponged" layer of paint is applied to the wall.

Another common home-decorating technique for applying paint is called rag rolling. U.S. Pat. No. 5,471,703 issued to Niven shows a roller having specialized slots therein. The specialized slots receive a rag that is wrapped around the roller and catches or is hooked into the various slots on the roller cover. Paint is applied to the rag and then the roller is used to apply or contact the wall to be painted. Like sponge painting, an initial layer or base layer must be applied to the surface. The initial layer of paint must be allowed to dry before rag rolling the second layer. Rag rolling can also be accomplished by wrapping a rag around a roller, applying paint to the rag and rolling it over a base layer.

U.S. Pat. No. 4,930,179 issued to Wright et al. shows a decorating tool that has flaps attached to a roller. The roller is used to produce a broken patterned surface-coating which is quick and easy to use even by non-specialists painters. One of the objects of U.S. Pat. No. 4,930,179 is to produce a tool which simulates the broken pattern of rag rolling.

The shortcomings associated with sponge painting are approximately the same as the shortcomings associated with rag rolling. In addition, a rag must be dealt with when using the rag rolling technique. This technique is somewhat more difficult than sponge painting a wall. The U.S. Pat. No. 4,930,179 includes the additional shortcoming that it will be difficult to control the amount of paint in the flaps attached to the roller. The flaps might also produce paint splatters. The flaps are also limp as shown in FIG. 2 of U.S. Pat. No. 4,930,179.

These methods are labor intensive, so there is a need for an apparatus which could produce sponge painting effect, custom wall painting as well as rag roll-type custom wall painting. There is also a need for several other custom wall painting schemes. There is also a need for a manufacturing process and apparatus that can be used on commercially available roller covers to produce sponge painting-type custom walls as well as rag rolling-type custom walls. In addition, there is a need for an apparatus and method that can be used to treat commonly available roller covers that will produce other patterns to produce a custom painted wall. There is also a need for a process and apparatus that can produce roller covers for custom wall painting quickly and inexpensively. There is also a need for a process and apparatus that can be used to process commonly available rollers quickly and efficiently.

SUMMARY OF THE INVENTION

A process for treating roller covers for a paint roller includes the steps of providing a surface, forming a pattern on the surface, heating the surface, and contacting the roller cover with the heated surface. The heated surface is a metal. The heat is transferred from the heated metal surface to the roller cover when the heated metal surface contacts the roller cover. The heated surface sears or melts the nap of the roller cover. The surface can be provided with a pattern so that a pattern can be placed into the nap of the roller cover. The amount of heat is carefully controlled so that the desired amount of melting takes place on the nap. The end result of this process is a patterned roller that can be used to produce various effects when used to paint a wall or other surface. It should be pointed out that different patterns can be made onto the surface. It should also be pointed out that different depths of the surface and different amounts of heat can be employed to produce rollers having a different effect on painted walls.

A method for treating a roller cover include the steps of positioning an element with respect to a roller cover and removing a portion of the roller cover with said element to form a pattern on said roller cover. A laser could be positioned in close proximity to the roller cover. The laser could be held stationary or moved. The roller cover or covers could then be moved as well as rotated while the laser removed material from the nap of the roller cover or burned a desired pattern into the roller cover.

An apparatus used to treat the surface of a roller cover includes a surface having a desired pattern therein. A holder for a roller cover holds or presents the roller cover to the surface. A heater is attached to the surface. The apparatus may also include a mechanism for moving the surface. The apparatus may also include another mechanism for moving the surface. The various mechanisms can move at various rates with respect to one another. The surface can take one of several different forms. For example, the surface can be a die or a cylinder, or a paddle wheel like structure where individual paddles are brought into contact with the nap of the roller cover. The paddle wheel structure having individual elements can be used to touch the nap or surface of the roller cover. The dies are typically used to place a deeper pattern into the nap of a roller cover.

Advantageously, the manufacturing methods are used to process available roller covers. The manufacturing process is fast, efficient and relatively inexpensive. The end result is a roller cover that can be used by any person having the skill to paint with a roller but which can be used to produce a custom wall paint finish on most any desired surface.

BRIEF DESCRIPTION OF THE DRAWINGS

FIG. 5 is a schematic diagram showing another preferred embodiment of a machine for treating the nap of a roller.

FIG. 6 is a cutaway side view of a roller cover.

DETAILED DESCRIPTION OF THE PREFERRED EMBODIMENT

In the following detailed description of the preferred embodiments, reference is made to the accompanying drawings which form a part hereof, and in which are shown by way of illustration specific embodiments in which the invention may be practiced. It is to be understood that other embodiments may be utilized and structural changes may be made without departing from the scope of the present invention.

Figure 1:
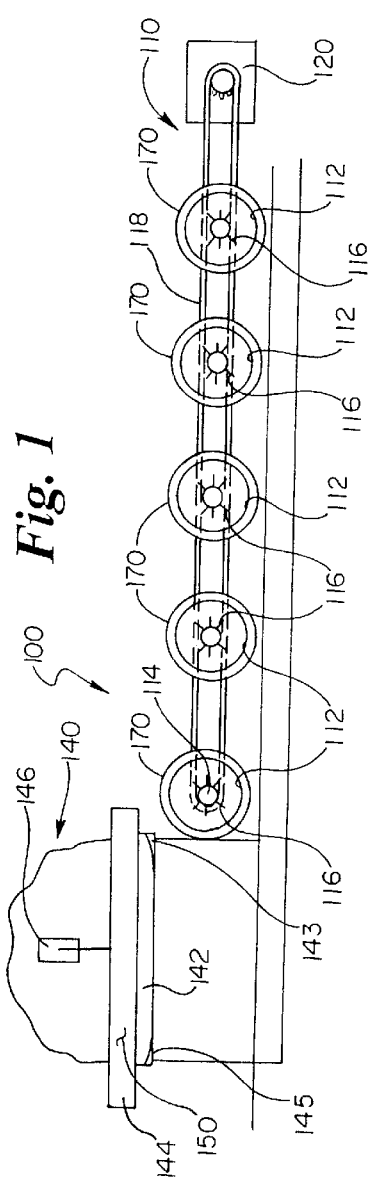
FIG. 1 is a schematic diagram showing one preferred embodiment of a machine for treating the nap of a roller cover for a paint roller.

FIG. 1 is a schematic diagram showing one preferred embodiment of a machine or apparatus for treating the nap of a roller cover for a paint roller. The apparatus for treating roller covers 100 is comprised of a roller cover mechanism 110 and a mechanism for holding a die 140. The mechanism for roller covers 110 includes a plurality of roller cover holders. The roller cover holders 112 include a shaft 114. On at least one end of the shaft 114 is a sprocket 116. Each of the roller cover holders 112 has a shaft 114 and a sprocket 116. Each of the sprockets is attached to a driver or chain drive 118. The chain drive 118 is attached to a controllable electrical motor 120. The controllable electrical motor 120 and the chain drive or driver 118 attached thereto are used to control the movement of the roller covers as they are mounted on the roller cover holders 112. The controllable electrical motor 120 is used to rotate the roller covers about the axis 114 of the roller cover holders 112. All of the rollers are capable then of rotating about their axis at approximately the same rotational velocity. The electrical motor 120 is controllable so that the rotational velocity of the roller cover holder 112 can be slowed down or sped up as required to produce a pattern in the roller cover.

The mechanism for holding a die 140 includes a platen 144 used to hold the die 142. A pressure cylinder or hydraulic cylinder 146 is attached to the platen 144. The pressure cylinder 146 applies a force to the platen 144 which in turn distributes the force over the surface the die 142. The die 142 is typically made of metal. The die 142 is formed by milling out a portion of the metal and leaving a raised pattern in the die 142. The die 142 is also known as an embossing plate. A heater or heating element (not shown, but located at position 150) is attached or embedded within the platen 144 to maintain the attached die 142 at a desired temperature. The heating element 150 produces a sufficient amount of heat so that the die 142 stays at a desired temperature as the roller covers are being processed. A control system (not shown), is used to maintain the platen 144 and die 142 at a desired temperature. Thermistors (not shown) within the platen 144 detect when a platen 144 is below a threshold value where energy is then added to heating element 150. If the platen is above a certain value, energy is not added to the heating element 150. The die 142 includes a first ramp 143 and a second ramp 145. The first ramp 143 and the second ramp 145 occur on the ends of the die 142.

In operation, the controllable electrical motor 120 is used to rotate the roller cover holders 112 and the roller covers attached thereto. One of either the mechanism for holding the die 140 or the mechanism for the roller covers 110 is moved transversely. If the mechanism for the roller covers 110 is moved, it is contemplated that a sliding table which contains the mechanism for the roller covers 110 could be used to move the roller covers into contact with the die 142. In the alternative, the mechanism for holding the die 140 can also be moved transversely with respect to the mechanism for holding the roller covers 110. The die 142 is maintained at a desired temperature. The desired temperature is between 500 and 600° F.

The hydraulic cylinder or pressure cylinder 146 is used to apply a force to the pressure plate 144 and also to move it with respect to the roller covers being held on the roller cover holder 112. In other words, the hydraulic cylinder 146 controls the depth to which the die 142 will contact the nap of the roller cover. One of either the mechanism for holding the roller covers 110 or the mechanism for holding the die 140 is moved transversely. The end result is that the die 142 will come into contact with the naps of the roller covers. The heating element 150 maintain the die 142 at a desired temperature so that the raised pattern of the die 142 is then burned into the roller covers. The depth to which the pattern is burned into the roller covers is controlled by the hydraulic cylinder or pressure cylinder 146. Controlling the depth with the hydraulic cylinder 146 also can be used to vary the depth of the patterns to produce roller covers having different effects when used to custom paint a wall. The first ramp 143 and the second ramp 145 prevent the die 142 from producing a ridge in the roller cover. In other words, the ramp gradually introduces the die 142 to the roller cover. The movement or rotation of the roller covers has to be in sequence with the transverse movement of the die 142 and platen 144 with respect to the mechanism for the roller covers 110. The movement is controlled so that as the die 142 is passed over the mechanism for the roller covers 110, each roller cover will roll over the entire surface of the die 142 and be embossed with a pattern that is milled into the die 142. By using this method, you can emboss or burn a pattern into several rollers with one pass under the die 142.

It should be noted that the die 142 cannot be positioned so that the roller covers "bottom out". In other words, the die 142 cannot be positioned so low that the patterns resulting from milling the die 142 extend all the way into the nap and so that the roller covers hit the bottom surface of the die 142. It should be noted that the die 142 could also be positioned so that it just barely contacts the roller cover or it can be positioned so that any depth of pattern can be achieved. The differing depths will produce roller covers having different effects.

Figure 2:
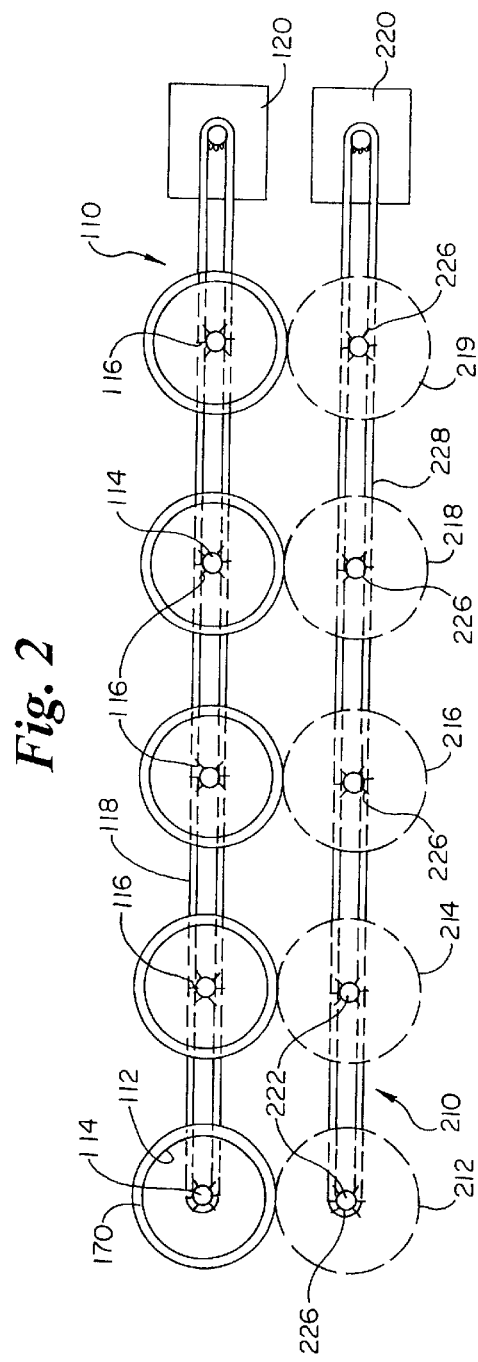
FIG. 2 is a schematic diagram showing another preferred embodiment of a machine for treating the nap of a roller.

FIG. 2 shows a schematic diagram of another preferred embodiment of a machine for treating the nap of a roller. This particular embodiment features a mechanism for roller covers 110 and a mechanism for cylindrical embossing plates or tubes 210. The mechanism for roller covers 110 includes a plurality of roller cover holders 112. Each roller cover holder 112 includes a shaft 114. At the end of each shaft 114 is a sprocket 116. A chain drive 118 is attached to each of the sprockets 116 on the shafts 114 as well as to a controllable electrical motor 120. Roller covers 170 are attached to the roller cover holders 112. In order to load and unload the roller covers, the roller cover holders 112 are expandable tube holders.

The mechanism for cylindrical embossing plates 210 is comprised of a plurality of embossing cylinders 212, 214, 216, 218 and 219. The outside surface of each of the embossing cylinders 212, 214, 216, 218 and 219 have a pattern formed in the outside surface of the embossing cylinder. The outside surface of the embossing cylinder serves the same purpose as the die described above. The pattern can be formed by any number of ways including etching away a portion of the cylinder to leave a pattern or machining or milling away a portion of the outside surface of the embossing cylinder. It is also contemplated that the embossing cylinder could be a solid cylinder or a tubular portion of a cylinder. Each of the embossing cylinders 212, 214, 216, 218 and 219 includes a shaft 222. The shaft of each of the embossing cylinders 212, 214, 216, 218 and 219 is substantially the same and therefore an individual number has not been placed on each individual shaft. Attached at the end of each shaft 222 is a sprocket 226. Sprocket 226 engages a drive chain 228. The drive chain 228 is also connected to a controllable electrical motor 220 which drives the chain which in turn drives each of the sprockets 226 attached to the shafts 222 of the embossing cylinders 212, 214, 216, 218 and 219. The drive chain 228 and the drive chain 118 must be driven at speeds such that the embossing cylinders 212, 214, 216, 218 and 219 can be driven in sequence with the roller covers 170 attached to the roller cover holders 112. If the embossing cylinders 212, 214, 216, 218 and 219 have the same radius as the roller covers 170 attached to the roller cover holders 112, it could be conceivable that the controllable electric motor 220 and the controllable electrical motor 120 could be the same controllable motor. However, it is more likely that the controllable motor 120 and controllable motor 220 would be different so as to allow maximum flexibility in adjusting the angular velocity of the roller cover holders 112 and the angular velocity of the embossing cylinders 212, 214, 216, 218 and 219. It is also contemplated that one of either the mechanism for the roller covers 110 or the mechanism for the cylindrical embossing plates 210 is attached to a body (not shown) which will move in a direction to separate the mechanism for roller covers 110 from the mechanism for the cylindrical embossing plates 210. Moving the two mechanisms away from one another will allow new roller cover 170 to be placed on the roller cover holders 112. The movement must also be controlled so that the depth of embossing can be adjusted and controlled.

As mentioned previously, the type of effect on the wall that the rollers will have is somewhat dependent upon the process in that a different effect will be produced by differing embossment depths. In some instances, the tip of the nap of the roller could be singed slightly to produce a different effect. In other instances, it may be desirable to remove material all the way down to the tube of the roller. In other words, all of the nap material would be removed by a heated portion of the embossing cylinder. Different effects would be produced by variations between just singeing the top and removing all the material so that it is necessary to have an adjustable engagement mechanism.

Figure 3:
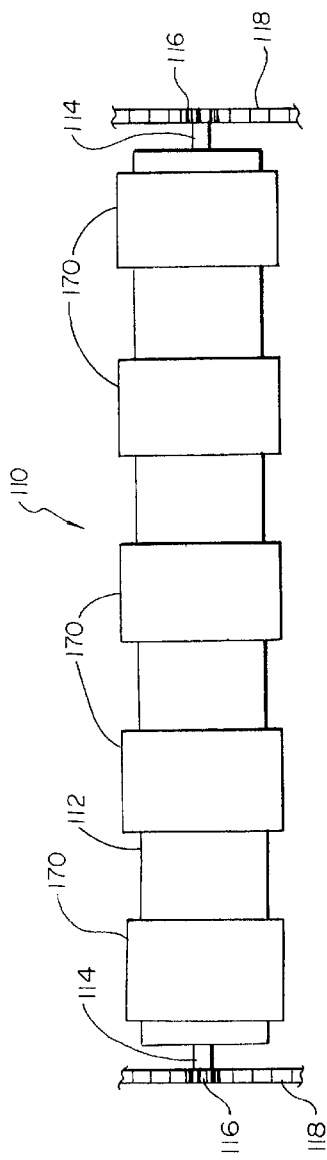
FIG. 3 is a top view of one of the roller cover holders shown in FIG. 2.

FIG. 3 shows a top view of the mechanism for roller covers 110. As can be seen, each individual roller cover holder 112 holds a plurality of roller covers 170. The top view also shows the shaft 114 having a sprocket 116 on each end of the shaft 114. The length of the embossing cylinder 212, 214, 216, 218 or 219 will have to be equal to the length of the roller cover holder 112.

Of course, the depth to which the pattern is embossed into the cylindrical outside surface of the embossing cylinder will determine how deep the embossing wheel will penetrate the roller covers 170 to remove a portion of the nap. If the remaining portion, for example, is one-half inch in height, the maximum depth to which the embossing wheel will penetrate the roller cover 170 will be somewhat less than one-half inch.

Each of the embossing cylinders 212, 214, 216, 218 and 219 is heated so that the outer cylindrical surface is maintained between 450 and 600° F. as it is rolled over the mating roller cover 170. The embossing cylinders 212, 214, 216, 218 and 219 are heated by heating elements (not shown) within the embossing cylinders 212, 214, 216, 218 and 219. One could also have a heat source on the opposite side of the embossing cylinders 212, 214, 216, 218 and 219. The embossing cylinders 212, 214, 216, 218 and 219 could also be hollow and a heated liquid or heated gas could be passed through the hollow embossing cylinders 212, 214, 216, 218 and 219.

Figure 4:
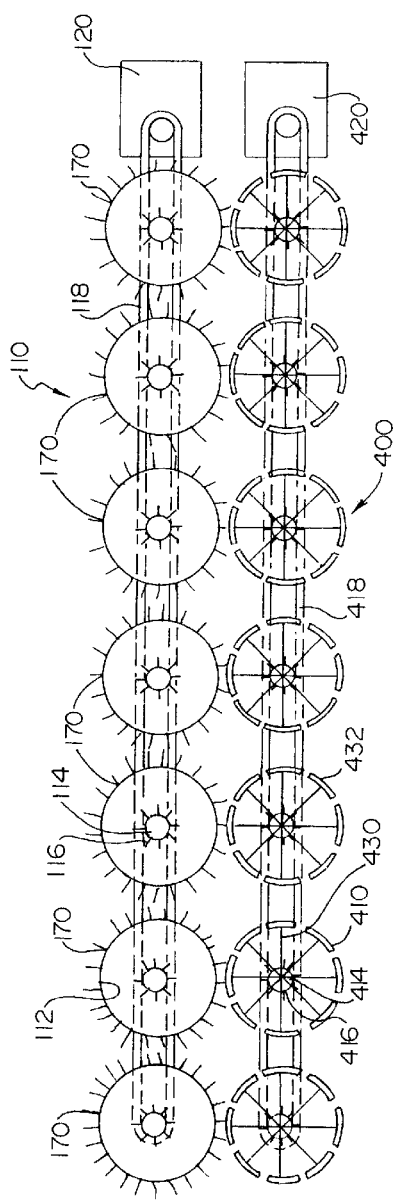
FIG. 4 is a schematic diagram showing another preferred embodiment of a machine for treating the nap of a roller.

FIG. 4 shows a schematic diagram of another preferred embodiment of the machine for treating the nap of the roller cover. In particular, this embodiment includes a mechanism for roller covers 110 and a mechanism for heated elements 400. The mechanism for roller covers 110 is similar to those described in FIGS. 1 and 2. The mechanism for the roller covers 110 includes a series of roller cover holders 112. Each of the roller cover holders 112 has a shaft 114. On the end of the shaft 114 there is a sprocket 116 which engages a drive chain 118. There are multiple roller cover holders 112, each having a shaft 114 and sprocket 116. Each of the sprockets 116 on the multiple roller cover holders 112 is engaged by the chain drive 118. The chain drive 118 is also connected to a controllable electric motor 120 which is used to vary the rotational rate of the roller cover holders 112. Roller covers 170 are placed upon the roller cover holders 112.

The mechanism for heated elements 400 also includes elements which are similar to the embossing cylinders 212, 214, 216, 218 and 219 of FIG. 2. The elements are held at the ends of a paddle wheel-like structure 410. The paddle wheel-like structure 410 is cylindrical in shape. Paddle wheel structure 410 includes a shaft 414. On the end of the shaft 414 is a sprocket 416. Each of the sprockets 416 on the paddle wheel elements 410 are connected to a chain 418 which drives each of the individual paddle wheel-like structures 410 at approximately the same angular velocity. The chain 418 is also attached to a controllable electrical motor 420 so that the angular velocity of all the paddle wheel-like structures 410 attached to the chain 418 can be varied as needed.

The paddle wheel-like structure 410 includes a number of stems 430 which are attached at one end to the shaft 414. At the other end of each stem 430 is a plate 432. The plate 432 can have any shape desired. The plate 432 is also somewhat curved so that it is approximately the same radius of curvature as the outside of a cylinder formed at the radius of the stem 430 and the thickness of the plate 432. The plate 432 can also have a pattern placed on its outer surface or it can be plain. The shape of the plates 432 can be used to make the pattern in the roller covers 170.

FIG. 5 shows a top view of the mechanism for heated elements 400 and the mechanism for the roller covers 110 as shown in FIG. 4. The plates 432 of the paddle wheel-like structure 410 are heated and pressed into the roller covers 170 to form a roller cover 170 such as the one shown in FIG. 5 and referred to as 170. Of course, it should be noted that in operation the mechanism for roller covers 110 or the mechanism for the heated elements 400 must be capable of being separated from one another so that new roller covers 170 may be loaded onto the mechanism for roller covers 110. It is also advantageous to have a mechanism that can adjustably vary the distance between the paddle wheel like structure 410 and the roller cover holder 112 so that the level of embossment of the roller covers 170 can be varied. The elements 432 are maintained in a temperature range of 450 to 600° F. A heating element (not shown) maintains the plates 432 at a temperature of 450 to 600° F. A heat source can be located opposite the roller cover holder 112 such that the plates 432 are heated and then rotated in engagement with the roller covers 170. The paddle wheel structure 410 could also be constructed from a hollow tube and electrical heating elements, a heated liquid or gas could be used to heat the tube. The heat would then be transferred down the length of the stem 430 attached to the tube and to the plate 432 at the end of the stem 430.

It should be noted that the mechanism for heated elements 400 is adjustable with respect to the mechanism for roller covers 110 such that the plates 432 can merely just barely touch the roller covers 170 or they can press deeper into the nap of the roller cover 170 to make a pattern. The distance from the mechanism for heated elements 400 must also be adjustable with respect to the mechanism for the roller covers 110 so that a new set of roller covers 170 can be placed on the rotating cylinders or roller cover holders 112. In operation, once the level of embossment is determined and the mechanism for the heated elements 400 is correctly positioned with respect to the mechanism for the roller covers 110, the chain drive 118 is moved by the controllable electrical motor 120 of the mechanism for roller covers 110. The chain drive 118 is driven by the controllable electrical motor 120 at a specified rate. At about the same time, the controllable electrical motor 420 drives the chain 418 to turn the paddle wheel-like structures 410 which hold the stems 430 and plates 432, so that the paddle wheel structures turn at about the same rate as the roller cover holders 112. The plates 432 of the paddle wheel-like structures 410 contact the roller covers 170 and emboss a pattern into the roller covers 170.

One such pattern is shown on the roller cover 170 in FIG. 5. Once a pattern has been embossed onto the roller covers 170, it is then removed and a new set of roller covers 170 is placed on the roller cover holder 112 and the process is repeated. The heating element maintains the heat of the plates 432 at approximately 450 to 600° F. It should be noted that the plates 432 can be inserted into the nap of the roller cover 170 to various depths. The degree to which the nap material is removed is directly proportional to the depth to which the heating elements or plates 432 are inserted into the nap of the roller cover 170. The roller cover 170 (as shown in FIG. 6) is comprised of a tube 610 and a nap 620 attached to the tube 610. The nap 620 is the name for the individual strands that hold the paint.

It is best to use a nap 620 that is made of synthetic material such as orlon, rayon, polyester, nylon or fortrel. When the heated element or plate 432 contacts the synthetic nap 620, the synthetic material evaporates. It is highly important to maintain the heating elements at a temperature between 450 and 600° F. so that the synthetic nap 620 is evaporated in a proper fashion. Referring now to FIG. 6, one of the key aspects of this process is that the heated element as inserted into the nap 620 must be of sufficient temperature and must be maintained at that temperature so that the sidewalls 630 of the removed portion 632 form a somewhat stiff vertical surface roughly parallel to a radius through the center of the cylinder of the roller cover 170. If the sidewalls 630 are stiff, then the pattern transferred to the wall by the paint roller cover will remain sharp since the sidewalls 630 will not bend over or flop over into the removed portion 632. A nap 620 of other materials could also be used. For example a "nap" of rubber or leather could be embossed to form a pattern therein.

FIG. 6 shows a cross-sectional view of a roller cover 170. The roller cover 170 includes a tube 610 and a nap 620. The nap 620 is attached to the tube 610. The tube 610 can be comprised of cardboard, plastic, metal or any number of other materials. The roller cover 170 shown in FIG. 6 also has a portion 632 which has been removed by a heated element by one of the processes described above. The removed portion 632 includes sidewalls 630 formed by evaporating or melting away a portion of the nap 620.

Figure 7:
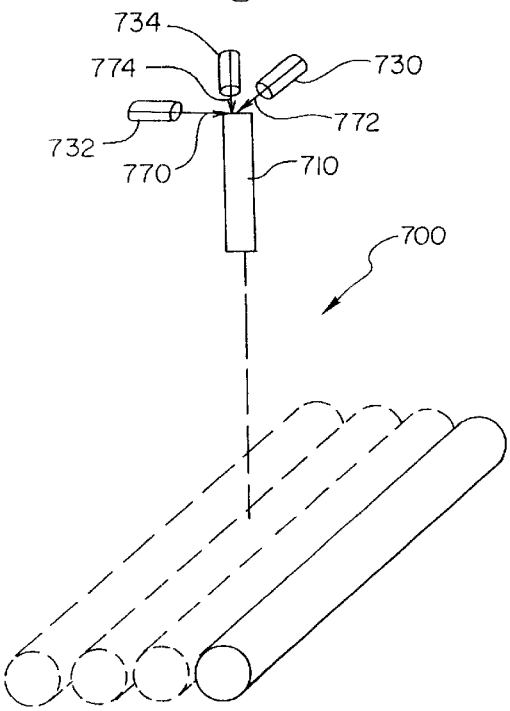
FIG. 7 is a schematic diagram showing another preferred embodiment of a machine for treating the nap of a roller which uses a laser to remove material from the roller cover.

FIG. 7 shows yet another preferred embodiment of an apparatus 700 for treating the nap of a roller which uses a laser. The apparatus 700 shown in FIG. 7 includes a laser 710 and the mechanism for the roller covers 110 of FIG. 2. As shown in FIG. 2, the mechanism for the roller covers 110 includes a roller cover holder or tube 112 which holds a plurality of roller covers. The tubes are mounted on axes or shafts 114 which have sprockets 116 on the end of the shaft. A drive chain 118 is connected to at least one roller cover holder and also is attached to a controllable electrical motor 120 to rotate the roller cover. The laser 710 is mounted so that it can move in x-, y- and z-planes. Actuators could control the laser 710 in the x-, y- and z-directions 770, 772 and 774. Actuator 732 controls the position of the laser 710 in the x direction 770. Actuator 730 controls the laser 710 in the y direction 772 and actuator 734 controls the laser 710 in the z direction 774. The actuators could be under program control so that a desired pattern could be scanned in and then produced on the roller cover. The controllable electrical motor 120 of the mechanism for roller covers 110 (shown in FIG. 2) could also be under program control by a CPU (not shown) such that the roller covers could be turned while the laser 710 is used to burn in the desired pattern. A general purpose computer (not shown) having a central processing unit could be used to produce the program control. It is conceived that a pattern could be scanned into a port of the general purpose computer and that the central processor (not shown) could then control the laser 710 as well as the speed of rotation of the roller covers to produce the pattern in the roller covers.

Figure 8:
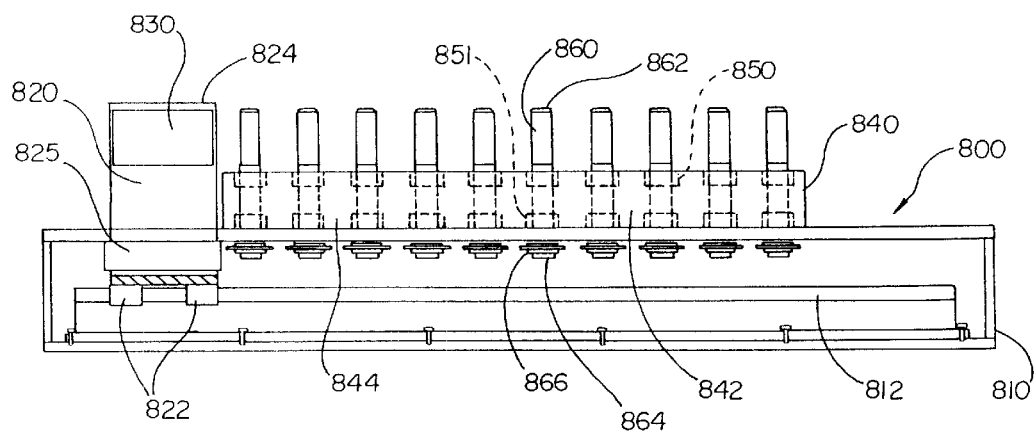
FIG. 8 is a side view of an apparatus for treating paint rollers.
Figure 9:
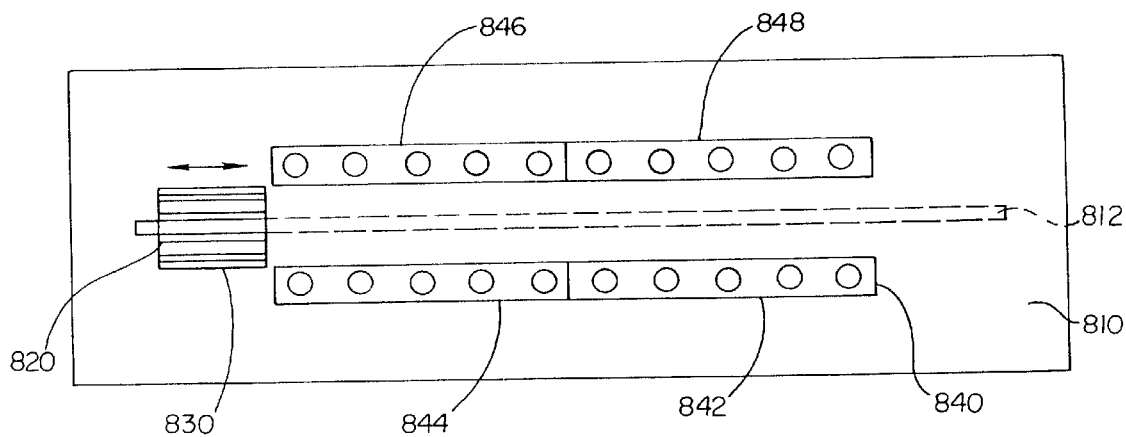
FIG. 9 is a top view of an apparatus for treating paint rollers.
Figure 10:
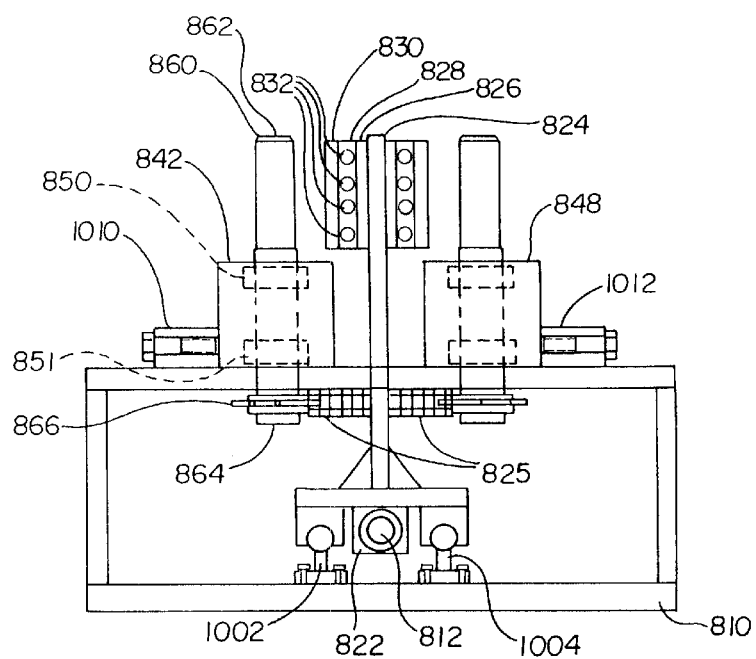
FIG. 10 is an end view of an apparatus for treating paint rollers.

FIGS. 8–10 are various views of an apparatus for treating paint rollers 800. FIG. 8 is a side view of the apparatus 800, FIG. 9 is a top view of the apparatus 800, and FIG. 10 is an end view of the apparatus 800. The apparatus for treating paint rollers 800 includes a frame 810 and carriage 820 and a roller cover holding apparatus 840. Attached to the bottom of the frame 810 is a ball screw or worm gear 812. The ball screw or worm gear 812 is used to move the carriage 820 along the length of the frame 810. Attached to the bottom of the carriage 820 are a pair of threaded blocks 822 which engage the threads on the ball screw or worm gear 812. When the ball screw or worm gear 812 is rotated, the carriage 820 moves along the length of the frame 810. The carriage 820 also includes an elongated body 824. The threaded blocks 822 are located on one end of the elongated body 824. Attached at the other end of the elongated body 824 is an insulator 826, a platen 828 and dies 830. Each side of the elongated body 824 carries a die 830. As a result, each side of the elongated body 824 has an insulator 826, a platen 828, and a die 830. Within the platen 828 are a plurality of heating cartridges 832. The platen 828 contain openings into which the heating cartridges 832 fit. Each heating cartridge 832 is cylindrical in shape and fits within the opening of the platen 828. Each platen 828 contains four heating cartridges 832. In this particular invention, each heating cartridge 832 is capable of delivering 500 watts of heat to the platen 828 and to the die 830 attached thereto. The platen 828 also includes at least one thermocouple (not shown). Thermocouples are used to indicate and control the temperature of the platen 828 and the die 830. If the thermocouple indicates that the temperature is below a desired level, electrical energy is added to the heating cartridges 832 until the temperature at the thermocouple is at the desired level. If the temperature of the platen 828 or thermocouple within the platen 828 is too high or above a desired level, electrical energy is not delivered to the electrical heating cartridges 832, thus effectively allowing the platen 828 and die 830 attached thereto to cool. The platens 828 and dies 830 are positioned on the elongated body 824 such that the dies 830 engage the paint roller covers when they are attached to the paint cover holder 840. A chain 825 is attached to the elongated body 824 between the threaded block 822 and the dies 830.

The paint cover holder 840 is comprised of several bearing blocks 842, 844, 846 and 848. The bearing blocks 842, 844, 846 and 848 have openings therein. In each opening there are two bearings pressed fit into the ends of each opening. All of the bearings are essentially the same so for the purposes of illustration in bearing block 842, a pair of bearings 850 and 851 are shown press fit into one of the openings in the bearing block 842. A roller mandrel 860 is placed inside the bearings 850 and 851. The roller mandrel 860 has a first end 862 for holding paint roller covers. The first end 862 is machined with ridges. Each roller mandrel 860 has a second end 864 which includes a sprocket 866. The bearing blocks 842, 844, 846 and 848 are adjustable so that the clearance or pressure between the roller covers on the roller mandrels 860 and a heated die 830 can be adjusted. The pressure or clearance has to be adjustable so that the processing of a particular set of roller covers can be adjusted to accommodate for differences in the production runs of the roller covers.

The ball screw 812 is attached to a variable speed DC motor (not shown), so that the ball screw 812 can be turned at various rates. When the ball screw 812 is turned at a slower rate, the carriage 820 moves more slowly with respect to the paint cover holder 840 and the individual roller mandrels 860 thereon. The speed of the carriage 820 is adjusted so that the heated die 830 attached to the carriage 820 transfers an appropriate amount of heat to the roller cover as the die 830 passes the mandrel 860 carrying a roller cover. In other words, the carriage 820 must be going at a slow enough rate so that the heated dies 830 are able to transfer enough heat to the roller covers to melt away or emboss the roller covers which are attached to the roller mandrels 860. FIG. 10 shows a linear bearing 1002 and a linear bearing 1004 positioned on each side of the ball screw or worm gear 812. The linear bearings 1002, 1004 stabilize the bottom of the carriage 820 as the threaded blocks 822 travel along the length of the ball screw or worm gear 812.

Also shown in FIG. 10 is an adjusting block 1010 and an adjusting block 1012. The adjusting blocks 1010, 1012 are used to adjust the distance between the roller mandrels 860 and the dies 830 on the carriage 820 so that the nap will be removed by the heated dies 830. The roller mandrels 860 are adjusted with the roller covers thereon. In operation, the carriage 820 is moved past the roller covers and the die 830 attached to the carriage 820 engages individual roller covers on individual mandrels 860 to emboss the roller covers with the design on the die 830. It is very important that the roller mandrels 860 turn at the same rate as the carriage 820 passes the roller mandrels 860. The chain 825 attached to the carriage 820 is critical in assuring that the roller mandrels 860 turn at the same rate as the carriage 820 passes the roller mandrels 860. In operation, the chain 825 on the carriage 820 engages the sprockets 866 attached to the second end 864 of the roller mandrels 860. As the carriage 820 passes the roller mandrel 860, the sprocket 866 remains engaged and turns the mandrel 860 at the appropriate rate. After the carriage 820 has passed, the sprocket 866 disengages the chain 825 and the roller cover and the mandrel 860 stop rotating. After the roller cover cools, it can be removed from the first end 862 of the roller mandrel 860. Again, the speed of rotation of these mandrels 860 is adjustable to match the linear speed of the advancing die 830.

In operation, paint roller covers are placed on the roller mandrels 860. The temperature of the die 830 or more accurately the temperature of platen 828 to which the die 830 is attached is heated until it reaches an appropriate temperature. In most instances, the temperature needed to emboss the rollers is usually in the range of 450 to 500° Fahrenheit. As mentioned previously, heat is provided by heater cartridges 832 which fit within the platen 828. Presently four 500 watt heating cartridges 832 supply the heat needed to emboss the nap of a plurality of roller covers. Once the die 830 and platen 828 are at operating temperature, the ball screw 812 is advanced so that the carriage 820 engages the roller cover on the roller mandrel 860 as well as the sprocket 866 on the carriage 820. The ball screw 812 is turned until the carriage 820 and the die 830 carried thereon passes all of the roller mandrels 860. The carriage 820 therefore passes from one end of the paint cover holder 840 to the other of the paint cover bolder 840. After the carriage 820 has passed a particular mandrel 860 and roller cover, the die 830 will have embossed the roller cover. After the roller cover cools a sufficient amount, an operator can remove the embossed roller covers from the mandrels 860 and replace them with unembossed roller covers. The direction of the ball screw 812 can be reversed, therefore bringing the carriage 820 and the dies 830 attached thereto past the paint roller cover holder 840 and the mandrels 860 once again in the other direction. The paint roller covers which are embossed are removed from the roller mandrels 860 and reloaded with additional new roller covers that are not embossed. The process is repeated until a selected or determined amount of roller covers are manufactured.

There is also a control system (not shown) that is used to control the rate of speed of the ball screw 812 and carriage 820. The control system also controls the heat cartridges 832 and the platen 828 so that the die 830 stays at an appropriate temperature to deliver the needed heat to the roller covers on the mandrels 860. The control system is programmable such that the heat and temperature can swing through a selected amount of temperature range. The temperature range is typically selected so that throughout the range, it can properly emboss the roller covers.

Figure 11:
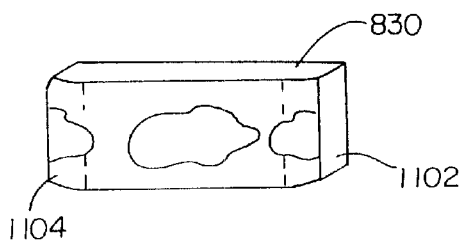
FIG. 11 shows a side view of die used in treating naps of roller covers.
Figure 12:
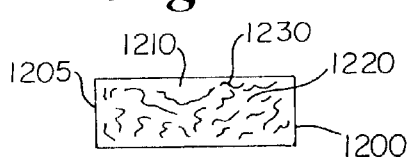
FIG. 12 shows a top view of roller cover as treated using the apparatus for treating the nap.
Figure 13:
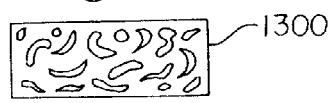
FIG. 13 shows a top view of roller cover as treated using the apparatus for treating the nap.
Figure 14:
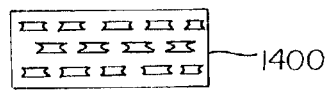
FIG. 14 shows a top view of roller cover as treated using the apparatus for treating the nap.
Figure 15:
FIG. 15 shows a top view of roller cover as treated using the apparatus for treating the nap.
Figure 16:
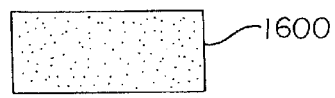
FIG. 16 shows a top view of roller cover as treated using the apparatus for treating the nap.
Figure 17:
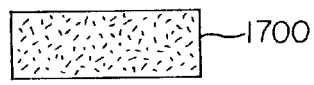
FIG. 17 shows a top view of roller cover as treated using the apparatus for treating the nap.
Figure 18:
FIG. 18 shows a top view of roller cover as treated using the apparatus for treating the nap.
Figure 19:
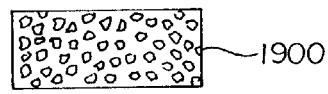
FIG. 19 shows a top view of roller cover as treated using the apparatus for treating the nap.
Figure 20:
FIG. 20 shows a top view of roller cover as treated using the apparatus for treating the nap.
Figure 21:
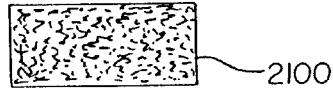
FIG. 21 shows a top view of roller cover as treated using the apparatus for treating the nap.
Figure 22:
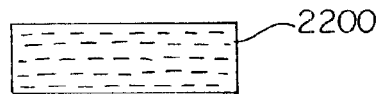
FIG. 22 shows a top view of roller cover as treated using the apparatus for treating the nap.
Figure 23:
FIG. 23 shows a top view of roller cover as treated using the apparatus for treating the nap.
Figure 24:
FIG. 24 shows a top view of roller cover as treated using the apparatus for treating the nap.
Figure 25:
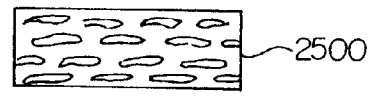
FIG. 25 shows a top view of roller cover as treated using the apparatus for treating the nap.

FIG. 11 shows a die 830. It is important that when the roller cover is embossed that there is no visible ridge as this will transfer onto a painted wall. It is also important that there is continuously a portion of the unembossed nap that is in contact with the wall at all times so there is not a totally unembossed ridge that contacts the wall forming a line pattern by the roller cover. To assure that the roller cover does not have a line or a ridge therein, the die 830 is fashioned so that half a pattern is occurring at one end 1102 of the die 830 and the other half of the pattern is occurring at the other end 1104 of the die 830. This produces an unembossed portion on the roller cover where there otherwise might be a ridge. An additional feature of the die 830, is that the ends 1102 and 1104 are somewhat beveled so that the engagement of the die 830 with an unembossed roller cover is gradual. This too prevents a ridge from forming on the treated roller cover.

FIGS. 12–25 each show a top view of a roller cover as treated using the apparatus for treating the nap. It should be noted that many types of patterns are possible in a roller cover when using the apparatus and techniques described herein. The roller cover 1200 includes a core 1205 with a nap 1210 attached to said core 1205. The core 1205 is usually a tube made of plastic, paper or a similar material. After being treated with the above described apparatus, portions of the nap 1210 are removed to form a pattern of removed portions 1230 of nap and remaining portions 1220 of nap. The result of treatment also may be thought of as forming a pattern of unembossed portions 1220 and embossed portions 1230. The unembossed portions 1220 of the roller cover 1200 are positioned so that the roller cover 1200 is always supported along its length by a plurality of unembossed portions 1220 of nap regardless of the rotational position of the nap 1210 with respect to the surface being coated. The unembossed portions 1220 of nap are the portions of the nap remaining after the heated die 830 has been pressed into the nap. The unembossed portions 1220 prevent a portion of the core 1205 of the roller cover 1200 from contacting the surface being painted. In other words, the core 1205 of the roller cover 1200 is prevented from "bottoming out" onto the surface being painted. The die 830 that produces the pattern must be set up to produce the pattern of embossed portions 1230 and unembossed portions 1220 in which the unembossed portions 1220 or remaining portions of the nap support the roller cover 1200 during painting or coating of a surface. The die 830 forms a pattern on the roller cover 1200 such that the remaining portion 1220 of the nap supports the roller cover 1200 regardless of the rotational position of the roller cover 1200.

Rather than describe each of the patterns on the roller covers 1200, 1300, 1400, 1500, 1600, 1700, 1800, 1900, 2000, 2100, 2200, 2300, 2400, and 2500, it can be said that each has a pattern which has remaining portions that support or space the roller cover from the surface being coated regardless of the rotational position of the roller cover. This prevents the core of the roller cover from contacting the surface being coated. The unembossed portions or remaining portions of the nap that support the roller cover during painting or coating. Each of the roller covers 1200, 1300, 1400, 1500, 1600, 1700, 1800, 1900, 2000, 2100, 2200, 2300, 2400, and 2500 can also be thought of as forming a pattern in which the remaining portion of the nap supports the roller cover during painting.

Figure 26A:
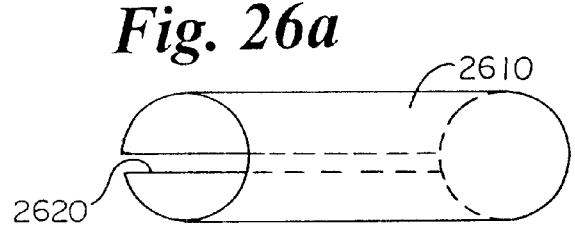
FIG. 26a shows an isometric view of roller core having a slit therein.
Figure 26B:
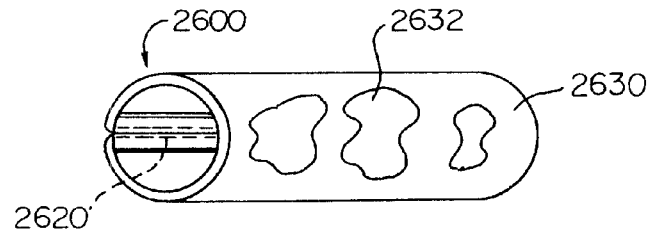
FIG. 26b shows an isometric view of roller core having a slit therein and having a woven roller cover attached to the roller core.

Now turning to FIGS. 26a, 26b, 27 and 28, another preferred embodiment for forming a roller cover 2600 having a pattern or patterns is to weave a pattern onto a fabric and then attach the fabric to a backing material. The woven pattern would include portions that are raised or elevated. FIGS. 26a and 26b show a roller core 2610 that has a lengthwise slit 2620 therein. A fabric 2630 with the raised patterns, such as 2632, is rectangularly shaped and has a dimension that will allow it to be placed over the core 2610. To attach the fabric 2630 to the core 2610, the two ends of the rectangularly shaped fabric 2630 are placed into the slit 2620. Optionally, an adhesive can be placed on the core 2610 before the fabric ends are placed into the slit 2620

Figure 27:
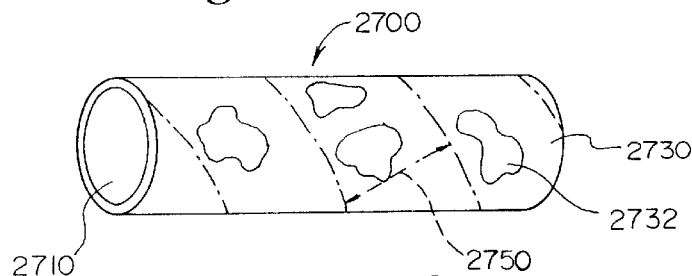
FIG. 27 shows an isometric view of roller cover having a woven fabric attached to the roller cover by wrapping the fabric over the roller core.

FIG. 27 shows another preferred embodiment for attaching the fabric 2730 to a roller core 2710 to form a roller cover 2700. In this instance, the fabric 2730 is woven and includes raised patterns 2732. The fabric is either woven in a strip having a width dimension 2750 or is cut into a strip having a similar dimension. An adhesive is then applied to the core 2710 and the fabric 2730 is attached to the core 2710 until a bond develops. As shown in FIG. 27, the fabric is placed on the core 2710 in a helical pattern. This has the advantage that only one cut at each end of the tube need be made to complete the roller cover 2700. The fabric 2730 could also be placed on the roller core 2610 2710 in several lengthwise or circumferential strips. This would require additional cuts in the manufacturing process.

Figure 28:
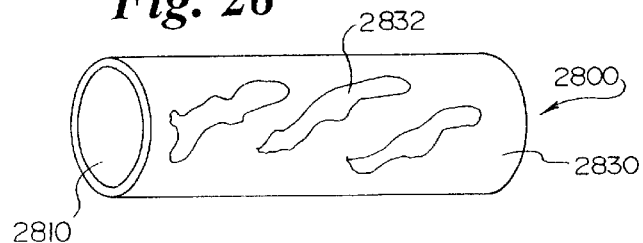
FIG. 28 shows an isometric view of roller cover having a tubular woven fabric attached to the roller core.

FIG. 28 shows yet another preferred embodiment for forming a roller cover 2800 having raised patterns 2832. In this embodiment, the fabric 2830 is woven in a tubular fashion with raised patterns 2832 occurring in the tubular weave. To attach the fabric tube 2830 to the roller core 2810, the tube of fabric 2830 is stretched or placed over the roller core 2810 and bonded into place. This method has the advantage that the raised pattern portions 2832 of the fabric 2830 do not have to be accommodated. By contrast, the roller cover 2700 must make the pattern such that it does not occur at one of the seams of the helix. Roller cover 2600 also must accommodate the tuck when considering the patterns 2632.

Figure 29:
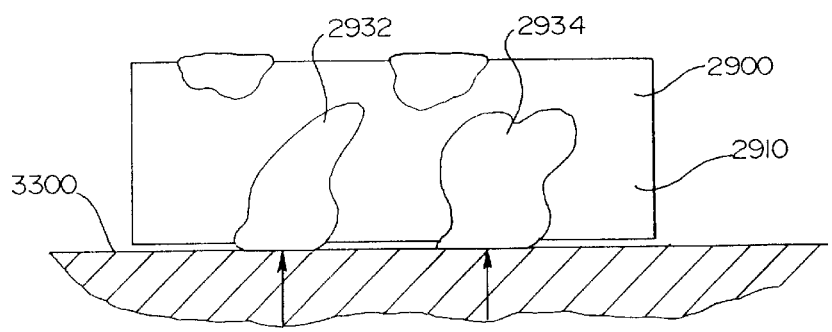
FIG. 29 shows a view of roller cover positioned against a surface.
Figure 30:
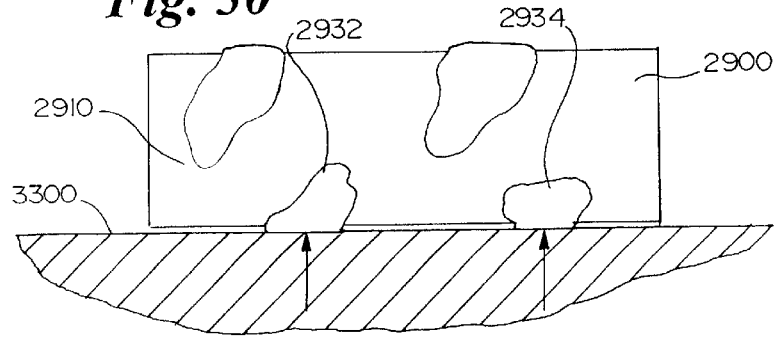
FIG. 30 shows a view of the roller cover shown in FIG. 29 positioned against a surface after it has been rotated or rolled slightly.

All of the patterns described herein have another feature that is illustrated in FIGS. 29 and 30. The raised pattern portion of the roller covers prevent a portion of the core 2910 of the roller cover 2900 from contacting the surface 3300 being painted. In other words, the core 2910 of the roller cover 2900 is prevented from "bottoming out" onto the surface 3300 being painted since at any position during the rolling process, the roller cover 2900 is positioned on a plurality of raised pattern portions 2932, 2934. FIG. 29 shows a roller cover 2900 in a first position. Raised pattern portions 2932 and 2934 space the roller cover 2900 from the surface 3300 being painted. The roller cover 2900 is shown in a second position in FIG. 30. Raised pattern portions 2932 and 2934 still maintain a space between the surface 3300 and the roller core 2910. As the roller cover 2900 continues to be rolled, other raised pattern portions will contact the surface 3300 and keep the roller core 2910 from contacting the surface 3300. The pattern on the roller cover 2900 is such that the raised nap or pattern portions support the roller core 2910 and prevent it from contacting the surface 3300 regardless of the rotational position of the roller cover 2900.

Although specific embodiments have been illustrated and described herein, it is appreciated by those of ordinary skill in the art that any arrangement which is calculated to achieve the same purpose may be substituted for the specific embodiments shown. This application is intended to cover any adaptations or variations of the present invention. Therefore, it is manifestly intended that this invention be limited only by the claims and the equivalents thereof.

What is claimed is:

1. An apparatus for embossing a pattern into a roller cover for a paint roller, said apparatus comprising:

a carriage having a first end and a second end;

a die attached to said first end;

a heater in thermal communication with said die;

a carriage mover attached to the second end of the carriage;

a plurality of mandrels for holding roller covers, said roller covers held so that the die attached to the first end of the carriage will contact the roller covers, each said mandrel including a first portion of a mechanism for rotating the mandrel as the carriage moves past the mandrel.

2. The apparatus for embossing a pattern into a roller cover for a paint roller of claim 1 wherein the first portion of the mechanism for rotating the mandrel as the carriage moves past the mandrel is a sprocket, and wherein the second portion of the mechanism for rotating the mandrel as the carriage moves past the mandrel is a chain attached to the carriage, said chain attached to the carriage engaging the sprocket on the mandrel as the carriage passes the mandrel.

3. The apparatus for embossing a pattern into a roller cover for a paint roller of claim 1 further comprising:

a temperature sensing device for sensing the temperature of said die;

a control line commutatively coupled to said heater; and a control circuit including an input from said temperature sensing device and having said control line communicatively coupled to said heater as an output, said control circuit controlling said heater in thermal communication with said die responsive to the temperature sensed by said temperature sensing device.

4. The apparatus for embossing a pattern into a roller cover for a paint roller of claim 1 wherein the die has a first end and a second end, one of the first end and the second end of the die has a beveled edge so that a ridge is not formed in a roller cover embossed with said die.

5. The apparatus for embossing a pattern into a roller cover for a paint roller of claim 4 wherein the die has a pattern on the first end of the die which mates with a pattern on the second end of the die.

\* \* \* \* \*